(12) United States Patent
Schmitt

(10) Patent No.: US 8,668,205 B2
(45) Date of Patent: Mar. 11, 2014

(54) FLAT SEAL COMPRISING SEALING BEAD AND EMBOSSING, AND METHOD FOR THE PRODUCTION THEREOF

(75) Inventor: Klaus Schmitt, Grunebach (DE)

(73) Assignee: Federal-Mogul Sealing Systems GmbH, Herdorf (DE)

(*) Notice: Subject to any disclaimer, the term of this patent is extended or adjusted under 35 U.S.C. 154(b) by 0 days.

(21) Appl. No.: 13/320,595

(22) PCT Filed: Jan. 26, 2010

(86) PCT No.: PCT/EP2010/050824
§ 371 (c)(1),
(2), (4) Date: Feb. 1, 2012

(87) PCT Pub. No.: WO2010/130469
PCT Pub. Date: Nov. 18, 2010

(65) Prior Publication Data
US 2012/0126491 A1 May 24, 2012

(30) Foreign Application Priority Data
May 15, 2009 (DE) .......................... 10 2009 021 503

(51) Int. Cl.
*F02F 11/00* (2006.01)
(52) U.S. Cl.
USPC ............................ 277/594; 277/593; 277/592
(58) Field of Classification Search
USPC .................................................. 277/590–595
See application file for complete search history.

(56) References Cited

U.S. PATENT DOCUMENTS

| | | | | | |
|---|---|---|---|---|---|
| 4,971,338 | A | * | 11/1990 | Udagawa | 277/595 |
| 5,009,438 | A | * | 4/1991 | Udagawa | 277/595 |
| 5,988,651 | A | * | 11/1999 | Miyaoh | 277/593 |
| 7,000,924 | B2 | * | 2/2006 | Hohe et al. | 277/593 |
| 2004/0183259 | A1 | | 9/2004 | Zerfass | |
| 2005/0189724 | A1 | * | 9/2005 | Schmitz | 277/592 |
| 2006/0232017 | A1 | * | 10/2006 | Hamada et al. | 277/594 |
| 2012/0193877 | A1 | * | 8/2012 | Okano et al. | 277/593 |

FOREIGN PATENT DOCUMENTS

| | | |
|---|---|---|
| DE | 101 43 431 A1 | 3/2003 |
| DE | 10 2004 056638 A1 | 10/2006 |
| DE | 10 2007 000376 A1 | 1/2008 |

* cited by examiner

*Primary Examiner* — Gilbert Lee
(74) *Attorney, Agent, or Firm* — Robert L. Stearns; Dickinson Wright, PLLC

(57) ABSTRACT

A metallic flat seal, in particular a cylinder head gasket, includes at least one through-hole, a functional layer, a spacer layer, and a stopper layer which is arranged between the functional layer and the spacer layer, as well as a closed sealing bead around every through-hole in the functional layer, wherein the sealing bead points in the direction of the stopper layer, the seal additionally comprising an embossed closed contour around every through-hole in that least the stopper layer, the functional layer or the spacer layer, wherein the contour forms a fixing aid. A method is also provided for making such a gasket.

14 Claims, 2 Drawing Sheets

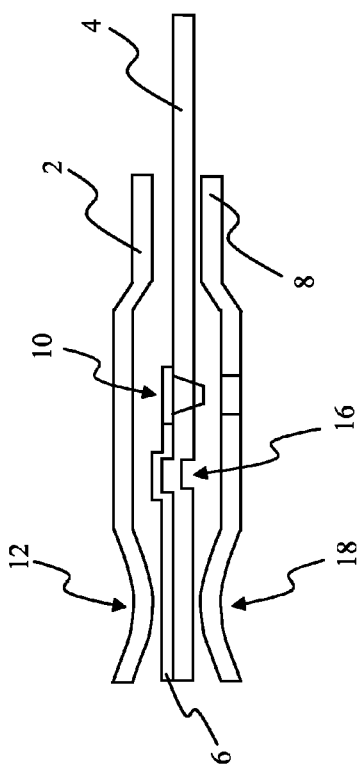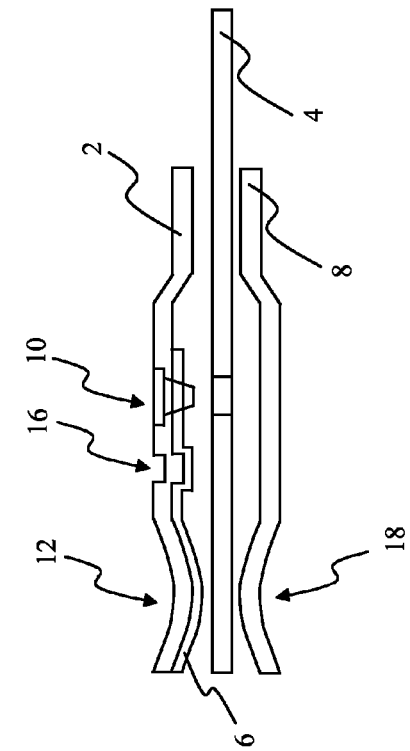

FLAT SEAL COMPRISING SEALING BEAD AND EMBOSSING, AND METHOD FOR THE PRODUCTION THEREOF

BACKGROUND OF THE INVENTION

1. Technical Field

The present invention relates to a metallic flat seal, in particular a cylinder head gasket, comprising a sealing bead and an embossed anti-slip protection and/or embossed additional seal.

2. Related Art

The sealing function of metallic flat seals is generated, among other things, by forming sealing beads which effect local compression increases and enclose passageways such as cylinder openings, water and oil passages in a closed manner. At the sealing bead, one or a plurality of linear sealing zones is generated. Sealing beads can be formed as half bead or full bead.

However, sealing beads function optimally only in a limited range of deformation. On the one hand, a minimum compression has to be ensured so as to generate a sealing by a slight and elastic deformation of the sealing bead. On the other, the sealing bead must not be pressed completely flat, in particular must not be plastically deformed but has to remain elastic because otherwise the sealing effect gets lost. Thus, it has to be ensured during engine operation that the sealing bead can function within a range of elastic deformation.

In order to prevent a complete flattening, so-called compression limiters or stoppers are used. This involves local thickness increases next to a sealing bead. The maximum thickness of the compression limiter is selected such that a minimum deformation is possible and, at the same time, the minimum is such that the maximally possible deformation under pressure is not high enough to plastically deform the sealing bead.

In case of cylinder head gaskets for engines having more than one cylinder, compression limiters can be configured in a spectacles-like shape (i.e. in the form of connected rings). Flanging layers for forming a stopper is possible; however, it is less flexible and is possible only at the edge of layers of the seal. Seals with compression limiter and a layer therebelow are known, wherein a coating material is provided between the compression limiter and said layer. For fastening additional stopper layers, it is known to fasten the compression limiters onto functional layers, spacer layers or also protective layers by means of laser welding or mechanical joining techniques.

However, in case of these ways of fastening stoppers as additional layer, there is the risk that the compression limiter or the stopper gland shifts during the operation of the engine. Also, it is possible that leaking gas penetrates or escapes between the stopper layer and the adjacent layer or, in general, between any layers. In the prior art, this is prevented by coatings which are applied onto one of the respective layers.

SUMMARY OF THE INVENTION

It is therefore an object of the present invention to provide a generic flat seal comprising an improved anti-slip protection and/or improved sealing between layers.

According to a first aspect of the invention, a metallic flat seal is provided, in particular a cylinder head gasket having at least one through-hole, comprising a functional layer;
a spacer layer; and
a stopper layer arranged between the functional layer and the spacer layer;
in each case one closed sealing bead around each through-hole in the functional layer, and
in each case one embossed closed contour around each through-hole at least in the stopper layer, the functional layer or the spacer layer, wherein said contour forms a fixing aid.

According to another aspect of the invention, an embossment forms the fixing aid whereby slipping is effectively prevented. Slipping of the sheets is prevented by the additional support which is formed by the fixing aid.

According to one embodiment
the spacer layer and the stopper layer rest against each other;
the embossed contour is a form-fitting common contour in the spacer layer and the stopper layer; and
the embossed contour points in the direction of the functional layer.

By forming a common form-fitting embossment in the spacer layer as well as the stopper layer, the anti-slip protection is further improved. Furthermore, the form-fitting embossment generates additional micro-sealing between spacer layer and stopper layer which prevents leaking gases from escaping between the layers. Thus, an additional coating to prevent this is no longer required. The distance layer and the stopper layer can be connected, for example, by means of clinching, wherein in addition to that, the embossment is provided.

According to one embodiment
the functional layer and the stopper layer rest against each other;
the embossed contour is a form-fitting common contour in the functional layer and the stopper layer; and
the embossed contour points in the direction of the spacer layer.

By forming a common form-fitting embossment in the functional layer as well as the stopper layer, the anti-slip protection is further improved. Furthermore, the form-fitting embossment generates additional micro-sealing between spacer layer and stopper layer which prevents leaking gases from escaping between the layers. Thus, an additional coating to prevent this is no longer required. The distance layer and the stopper layer can be connected, for example, by means of clinching, wherein in addition to that, the embossment is provided.

According to one embodiment
the spacer layer has an embossed contour, and
the embossed contour points in the direction of the functional layer.

These embodiments are provided, among other things, for flat seals in case of which the stopper layer is fastened to the functional layer, for example by clinching, and wherein stopper and functional layers are folmed together so as to form the sealing bead. The embossment can then be provided jointly and form-fittingly in the functional layer and the abutting stopper layer while pointing in the direction of the spacer layer or, alternatively, in the spacer layer and pointing in the direction of the functional layer.

According to one embodiment, the embossed contour, when viewed in the radial direction from a respective through-hole, is arranged before and/or behind the corresponding sealing bead, and the sealing bead is preferably aligned in the direction of the stopper layer.

In radial view from the through-hole, the embossment can be provided before or behind the respective sealing bead, or the embossment is a double contour which is provided before as well as behind the respective sealing bead. In embodiments of the invention, the height or depth of the embossment can be in the range of 1/200 mm to 1/400 mm and can be 0.1 mm wide.

In embodiments of the invention, the embossment can additionally have a function as compression limiter for the sealing bead.

According to one embodiment, the flat seal further comprises
- a second functional layer on the spacer layer's side facing away from the stopper layer; and
- in each case a closed sealing bead around each through-hole in the second functional layer, wherein the sealing bead points in the direction of the spacer layer.

According to one embodiment
- the sealing bead(s) in the functional layer and/or the second functional layer overlap with the stopper layer.

This involves the so-called "bead-on-stopper" design.

According to a second aspect of the invention, a method is provided for producing a metallic flat seal, in particular a cylinder head gasket, having at least one through-hole, the method comprising
- providing a functional layer;
- providing a spacer layer; and
- providing a stopper layer arranged between the functional layer and the spacer layer;
- providing in each case a closed sealing bead around each through-hole in the functional layer, and
- embossing a closed contour around each through-hole in at least the stopper layer, the functional layer or the spacer layer, wherein the contour forms a fixing aid.

According to one embodiment, the method further comprises
- connecting the spacer layer and the stopper layer so that spacer layer and stopper layer rest against each other;
wherein the contour is embossed form-fittingly and jointly into the spacer layer and the stopper layer, wherein the embossed contour points in the direction of the functional layer.

According to one embodiment, the method further comprises
- connecting the functional layer and the stopper layer so that functional layer and stopper layer rest against each other;
wherein the contour is embossed form-fittingly and jointly into the functional layer and the stopper layer, wherein the embossed contour points in the direction of the spacer layer.

Connecting layers can be carried out by means of clinching.

According to one embodiment, the functional layer and the stopper layer are formed jointly so as to form the sealing bead.

According to one embodiment, the contour is embossed into the spacer layer, wherein the embossed contour points in the direction of the functional layer.

According to one embodiment, the contour, when viewed in the radial direction from a respective through-hole, is embossed before and/or behind the corresponding sealing bead, wherein the sealing bead points in the direction of the stopper layer;

According to one embodiment, the method further comprises
- providing a second functional layer on the spacer layer's side facing away from the stopper layer; and
- providing in each case a closed sealing bead around each through-hole in the second functional layer, wherein the sealing bead points in the direction of the spacer layer.

According to one embodiment, the sealing bead(s) in the functional layer and/or the second functional layer overlap with the stopper layer.

Embossing can be carried out simultaneously with connecting layers, for example by clinching, so that no additional production step is necessary.

THE DRAWINGS

The invention is explained in more detail hereinafter with reference to the drawings, in which FIG. 1 shows a first embodiment of a flat seal according to the invention in a cross-sectional view;

FIG. 2 shows a second embodiment of a flat seal according to the invention in a cross-sectional view;

DETAILED DESCRIPTION

Figure 4:
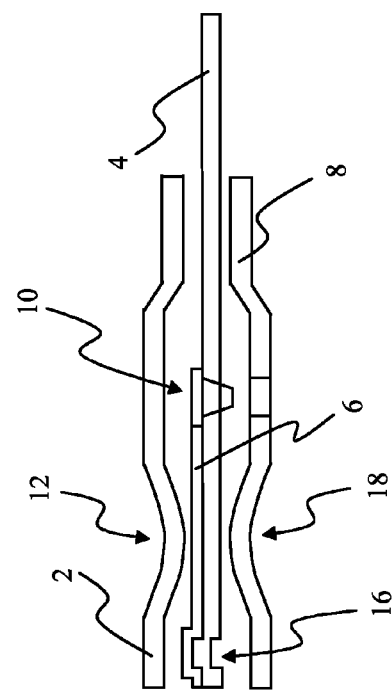
FIG. 4 shows an alternative embodiment of a flat seal of FIG. 1.

FIG. 1 shows a first embodiment of the flat seal according to the invention. The flat seal comprises a functional layer 2, a spacer layer 4, a stopper layer 6 and a second functional layer 8. In the functional layers 2 and 8, sealing beads 12 and 18, respectively, are provided, each of which point in the direction of the distance layer and stopper layer, respectively. In the example shown here, the beads are full beads. In alternative embodiments, half beads or a combination of half and full beads are also possible.

The stopper layer 6 is connected by means of clinching at clinching points 10 (only one is shown here) to the spacer layer 4. The spacer layer 4 can be a carbon steel layer. In the embodiment shown here, a common embossment 16 in spacer layer 4 and stopper layer 6 is provided. The embossment 16 is form-fitting, i.e. the spacer layer 4 and the stopper layer 6 are connected in a form-fitting and thus fluid-tight manner at least at the embossment 16.

The embossment 16 forms a fixing aid or anti-slip protection which prevents the functional layer 2 or the interconnected stopper layer 6 and distance layer 4 from slipping by forming an additional support on the spacer layer 4 for functional layer 2/stopper layer 6. The embossment 16 points in the direction of the functional layer 2. In the example shown, the embossment 16, when viewed in the radial direction from the combustion chamber hole, is arranged behind the bead 12. An arrangement before the bead is also possible, or an arrangement before as well as behind the bead (i.e. as double contour). In an exemplary embodiment, the width of the embossment is 0.1 mm and the height is 0.02 to 0.04 mm.

Another function of the embossment 16 can be additional sealing. If the stopper layer 6 rests without coating on the spacer layer 4, leaking gases can penetrate or escape between the layers. By forming the embossment 16, additional sealing is generated which prevents the latter. A coating is not necessary for this.

FIG. 2 shows a second embodiment of the invention. This alternative also comprises a functional layer 2, a spacer layer 4, a stopper layer 6 and a second (but optional) functional layer 8.

In the functional layers 2 and B, sealing beads 12 and 18 are provided, respectively, which each point in the direction of the spacer or stopper layer. In the example shown here, the beads are full beads. In alternative embodiments, half beads or a combination of half and full beads are possible. The functional layer 2 is connected by means of clinching at clinching points 10 (only one is shown) to the stopper layer 6. The stopper layer 6 rests against the functional layer 2 and thus also follows the shape of the bead 12.

This geometry can be achieved, for example, in that the stopper layer 6 is connected to the functional layer 2 by clinching, for example, and is formed together with the functional layer 2 so as to form the sealing bead 12. Thus, at the same time, the embossment 16 can be jointly incorporated in the functional layer 2 and the stopper layer 8. The functional layer 2 and the stopper layer 8 are therefore connected in the region of the embossment 16 in a form-fitting and thus fluid-tight manner.

The embossment 16 forms an anti-slip protection for the sheets of the functional layer 2 and the stopper layer 6 connected thereto as well as the spacer layer 4. In this embodiment, the embossment 16 points in the same direction as the bead 12, i.e. in the direction of the spacer layer 4. In the example shown, the embossment 16, when viewed in the radial direction from the combustion chamber hole, is arranged behind the bead 12. An arrangement before the bead is also possible, or an arrangement before as well as behind the bead (i.e. as a double contour).

Additional sealing between the functional layer 2 and the stopper layer 6 can be formed by the embossment 16. Thereby, leaking gases are prevented from penetrating or escaping. A coating is not necessary for this.

Figure 3:
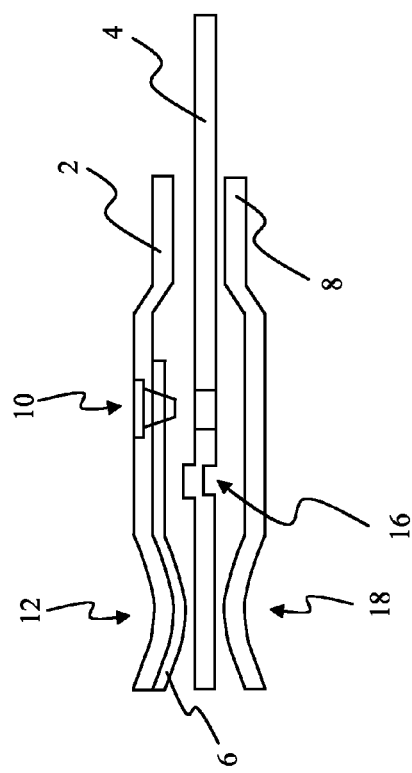
FIG. 3 shows a third embodiment of a flat seal according to the invention in a cross-sectional view.

FIG. 3 shows a third embodiment of the invention which represents an alternative embodiment of the flat seal FIG. 2. This flat seal also comprises a functional layer 2, a spacer layer 4, a stopper layer 6 and a second functional layer 8. Here too, the second functional layer 8 is optional.

In the functional layers 2 and 6, sealing beads 12 and 18, respectively, are provided which each point in the direction of the spacer or stopper layer. In the example shown here, the beads are full beads. In alternative embodiments, half beads or a combination of half and full beads are also possible. The functional layer 2 is connected by means of clinching at clinching points 10 (only one is shown here) to the stopper layer 6. The stopper layer 6 rests against the functional layer 2 and thus follows also the shape of the bead 12.

This geometry can also be achieved in that the stopper layer 6 is connected to the functional layer 2 by clinching, for example, and is formed together with the functional layer 2 so as to form the sealing bead 12. However, in deviation from the embodiment shown in FIG. 2, the embossment 16 is provided in the spacer layer 4. The embossment 16 points in the direction of the functional layer 2 and forms an anti-slip protection for the sheets of the functional layer 2 and the stopper layer 6 or spacer layer 4 connected thereto.

In the embodiment shown here, a sealing aid is generated by the embossment 16 after pressing in the engine compartment because at said embossment, the stopper layer 6 presses against the spacer layer 4.

FIG. 4 shows an alternative embodiment of the flat seal of FIG. 1 which corresponds substantially to the one of FIG. 1. However, in deviation therefrom, the embossment 16 is arranged here before the bead 12 when viewed in the radial direction.

The second functional layer is optional for all embodiments explained above. The flat seal according to the invention is preferably a cylinder head gasket as shown exemplary in the figures; however, it can also be another metallic flat seal.

The combustion chamber (or generally, the through-hole) is shown in the above figures in each case on the left side of the figure. Although above in each case only one through-hole corresponding to one combustion chamber is illustrated as an example, the flat seal can also be provided for multi-cylinder engines having more than one combustion chamber opening. Likewise, additional through-holes can be present in the seal, for example for cooling and lubricant passages or through-holes for mounting bolts. However, such through-holes can be sealed in a corresponding manner with sealing beads and a compression limiter according to the invention in the form of an embossment.

The sealing beads of the flat seal can be full beads or half beads. Half beads and full beads can be provided in a flat seal in any combination. For example, the sealing bead in the first functional layer can be a full bead and the additional bead in the optional second functional layer can be a half bead, or vice versa.

Connecting layers can also be carried by methods other than clinching, for example laser welding.

The embossment, when viewed in the radial direction from the through-hole, can be arranged behind (as shown in FIG. 1) or before (as shown in FIG. 4) the sealing bead. However, in a combination, the embossment can be arranged before as well as behind the sealing bead, for example in the form of a double contour.

With the seal according to the invention, escaping of leaking gases between the layers is reduced or even prevented completely. Slipping of the stopper or the stopper gland is prevented. The compression limiter is kept in position by the embossment or is formed by an embossment with fixed position. The embossment forms an additional support which serves as anti-slip protection.

A coating between the layers for preventing leaking gases from penetrating or escaping is not required because this object is taken on by the embossment. Besides the connection points, for example for clinching, no additional mountings are required. No additional production step is required because embossing can be carried out during clinching.

The invention is suitable for all embodiments of seals comprising layers. The invention permits the use of cost-effective materials.

The invention claimed is:

1. A metallic gasket, having at least one through-hole, comprising:
   a functional layer;
   a spacer layer; and
   a stopper layer arranged between the functional layer and the spacer layer; wherein
   a closed sealing bead extends around each through-hole in the functional layer;
   an embossed closed contour extends around each through-hole in at least the stopper layer, the functional layer or the spacer layer, wherein the contour forms a fixing aid; and
   the embossed closed contour, when viewed in the radial direction from a respective through-hole, is arranged before and/or behind the respective sealing bead, wherein the sealing bead points in the direction of the stopper layer;
   the spacer layer and the stopper layer rest against each other;
   the embossed closed contour is a form-fitting common contour in the spacer layer and the stopper layer; and
   the embossed closed contour points in the direction of the functional layer.

2. The metallic gasket according to claim 1, wherein the spacer layer has an embossed closed contour; and the embossed closed contour points in the direction of the functional layer.

3. The metallic gasket according to claim 1, further comprising:
   a second functional layer on the spacer layer's side facing away from the stopper layer; and
   a closed sealing bead around each through-hole in the second functional layer, wherein the sealing bead points in the direction of the spacer layer.

4. The metallic gasket according to claim 1, wherein the sealing bead(s) in the functional layer and/or the second functional layer overlap with the stopper layer.

5. A metallic gasket, having at least one through-hole, comprising:
   a functional layer;
   a spacer layer; and
   a stopper layer arranged between the functional layer and the spacer layer; wherein
   a closed sealing bead extends around each through-hole in the functional layer,
   an embossed closed contour extends around each through-hole in at least the stopper layer, the functional layer or the spacer layer, wherein the contour forms a fixing aid; and
   the embossed closed contour, when viewed in the radial direction from a respective through-hole, is arranged before and/or behind the respective sealing bead, wherein the sealing bead points in the direction of the stopper layer;
   the functional layer and the stopper layer rest against each other;
   the embossed closed contour is a form-fitting common contour jointly embossed in the functional layer and the stopper layer; and
   the embossed closed contour points in the direction of the spacer layer.

6. The metallic gasket according to claim 5, wherein
   the spacer layer has an embossed closed contour; and
   the embossed closed contour points in the direction of the functional layer.

7. The metallic gasket according to claim 5, further comprising:
   a second functional layer on the spacer layer's side facing away from the stopper layer; and
   a closed sealing bead around each through-hole in the second functional layer, wherein
   the sealing bead points in the direction of the spacer layer.

8. A method for the production of a metallic gasket, having at least one through-hole, comprising:
   providing a functional layer;
   providing a spacer layer;
   providing a stopper layer arranged between the functional layer and the spacer layer;
   providing a closed sealing bead around each through-hole in the functional layer, and
   embossing a closed contour around each through-hole in at least the stopper layer, the functional layer or the spacer layer, wherein the contour forms a fixing aid,
   wherein the embossed closed contour, when viewed in the radial direction from a respective through-hole, is embossed before and/or behind the corresponding sealing bead, wherein the sealing bead points in the direction of the stopper layer; and
   connecting the spacer layer and the stopper layer so that the spacer layer and the stopper layer rest against each other; wherein
   the closed contour is embossed form-fittingly and jointly into the spacer layer and the stopper layer, wherein the embossed closed contour points in the direction of the functional layer.

9. The method according to claim 8, further comprising:
   providing a second functional layer on the spacer layer's side facing away from the stopper layer; and
   providing a closed sealing bead around each through-hole in the second functional layer, wherein the sealing bead points in the direction of the spacer layer.

10. The method according to claim 5, wherein
    the sealing bead(s) in the functional layer and/or the second functional layer overlap with the stopper layer.

11. A method for the production of a metallic gasket, having at least one through-hole, comprising:
    providing a functional layer;
    providing a spacer layer;
    providing a stopper layer arranged between the functional layer and the spacer layer;
    providing a closed sealing bead around each through-hole in the functional layer, and
    embossing a closed contour around each through-hole in at least the stopper layer, the functional layer or the space layer, wherein the contour forms a fixing aid,
    wherein the embossed closed contour, when viewed in the radial direction from a respective through-hole, is embossed before and/or behind the corresponding sealing bead, wherein the sealing bead points in the direction of the stopper layer;
    connecting the functional layer and the stopper layer so that the functional layer and the stopper layer rest against each other; wherein
    the closed contour is embossed form-fittingly and jointly into the functional layer and the stopper layer, wherein the embossed closed contour points in the direction of the spacer layer.

12. The method according to claim 11, wherein the functional layer and the stopper layer are formed together so as to form the sealing bead.

13. The method according to claim 11, further comprising:
    providing a second functional layer on the spacer layer's side facing away from the stopper layer; and
    providing a closed sealing bead around each through-hole in the second functional layer, wherein the sealing bead points in the direction of the spacer layer.

14. The method according to claim 11, wherein
    the sealing bead(s) in the functional layer and/or the second functional layer overlap with the stopper layer.

* * * * *